Aug. 28, 1945.  W. J. NEISINGH  2,383,672
FILTER
Filed Oct. 12, 1942

INVENTOR
W. J. Neisingh
BY
ATTORNEYS

Patented Aug. 28, 1945

2,383,672

UNITED STATES PATENT OFFICE 2,383,672

FILTER

Walter J. Neisingh, Hanford, Calif.

Application October 12, 1942, Serial No. 461,649

14 Claims. (Cl. 210—169)

This invention relates to filters for fluids of different kinds, either gaseous or liquid, my principal object being to provide in a filter, a novel form of filter element which may be effectively used with, and which automatically adjusts itself to, fluids of different kinds under varying pressures, viscosities and other conditions, and which will have a minimum resistance to the passage of fluid therethrough and which provides a filter bed or sediment deposit area of considerable size.

Another object of the invention is to provide a filter element arranged so as to provide a continuous filter passage of hairline proportions or one of greater width as the nature of the fluid and the operating pressure may create or necessitate; and to incorporate such an element in a filter structure so that the passage width may be manually, as well as automatically, altered.

A further object is to provide a filter structure, including this novel filter element, arranged so that the element may be automatically cleaned when necessary without removing the same from the structure, while at the same time the element is removable for manual cleaning and inspection, or replacement.

Another object is to provide a filter element having pressure-face characteristics conducive to forming a "natural" filter bed, or one in which the coarser particles of any foreign matter form the inner layers adjacent the opening or passage and with the finer particles being intercepted in graduated order further back from the faces. This feature would be of value in the filtering of circulating fluids as in oil clarification and like operations, where the fluid passes through the filter many times.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
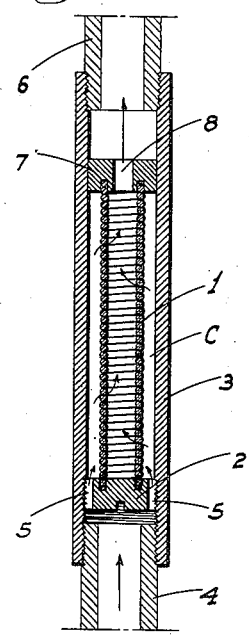
Figure 1 is a sectional elevation of a filter unit in its simplest form, and incorporating my improved filter element for flow therethrough from the outside to the inside.

Referring now more particularly to the characters of reference on the drawing, and at present to the device shown in Fig. 1, the filter element which is the essence of the invention, comprises a closely wound, relatively long, precision wound tempered spring helical coil 1 of the tension type, requiring at least a few pounds pull before any opening between the turns of the coil is effected. A passage between the outside and inside of the coil, ranging from hairline proportions to one of greater width, depending on the setting of the coil manually or by reason of the pressure acting against the coil, may thus be provided between adjacent turns of the coil. Since such space or passage extends unbrokenly from end to end of the coil, the actual area of the passage may be considerable, depending of course on the length and diameter of the coil and the diameter of the wire used in the same. For best results, the wire should be of circular cross-section, at least on the inlet side of the coil.

The coil at the inlet end of the filter is secured in a plug 2, removably secured into a casing 3 inwardly of one end thereof. The casing surrounds the coil in clearance relation to leave a chamber C therebetween. A fluid intake pipe 4 is connected to the casing at said one end thereof. The plug 2 has peripheral passages 5 therethrough establishing communication between the intake pipe and the casing chamber C.

An outlet pipe 6 is connected to the opposite end of the casing, the corresponding end of the coil being secured in another plug 7 having a close sliding fit in the casing and provided with a central passage 8 establishing communication between the interior of the coil and the pipe 6.

Fluid under pressure entering the chamber through the passages 5 fills the casing and filters through the passage formed between the turns of the coil throughout the length of the latter and then passes out from the interior of the coil through the passage 8 and outlet pipe 6. Since the plug 7 is slidable in the casing and is engaged by the fluid in the chamber around the coil, the extent to which the coil expands and opens up the filtering passage therethrough depends on the pressure, velocity and viscosity of the liquid; foreign matter accumulating on the outside of the coil or in the chamber. When it is necessary to inspect or clean the filter, the element 1 may be removed by detaching the casing from the intake pipe and unscrewing the plug 2.

Figure 2:
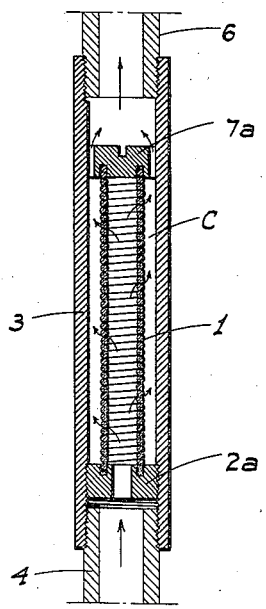
Figure 2 is a similar view showing the filter arranged for flow through the element from the inside to the outside.

The structure in Fig. 2 is essentially the same, but in this case the plug 2a, which is adjacent the intake pipe, is centrally passaged while the sliding plug 7a at the opposite end of the coil is peripherally passaged. With this arrangement, the filtering flow of the fluid is through the coil passage from the interior to the exterior of the coil, as will be obvious, but the filtering action will be the same as with the first described type. The above types of filter illustrate the simplest form in which the filter element of this particular type may be employed, and are included herein to show generally the basic principle of the invention.

Figure 3:
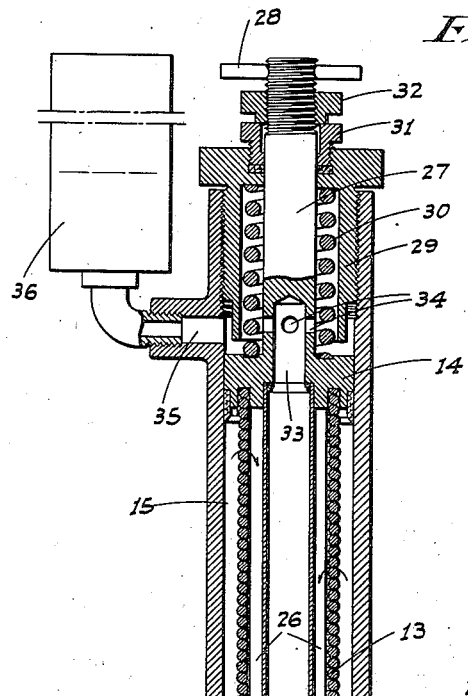
Figure 3 is a sectional elevation of an automatically and manually adjustable self-cleaning filter.
Figure 4:
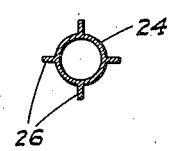
Figure 4 is a fragmentary cross-section on the line 4—4 of Fig. 3.

The use of this filter element in a device better adapted for general commercial use is shown in Fig. 3. In this structure the casing 9, which is preferably disposed vertically, is situated at its lower end with a removable, relatively long plug 10 in the lower end of which the outlet pipe 11 is secured, this pipe having a shut-off valve 12. The lower end of the normally closed tension filter coil 13 is rigidly secured in the upper end of the plug 10, while the upper end of the coil is similarly secured in a piston-plug slidable in the casing; a chamber 15 being thus formed in the casing about the coil between the plugs.

An intake pipe 16 is connected with the casing on one side intermediate the ends of the plug 10, which is reduced in diameter in the zone of said pipe to provide an annular passage which forms, with the adjacent portion of the casing, a sediment chamber 17. The intake pipe is preferably associated with bypass 18 leading back to the source of supply and having a pressure regulating valve 19 therein. The pipe 16 is provided with a shut-off valve 20 between the bypass and the casing. A normally closed drain cock 21 is also connected to the casing to communicate with chamber 17. Axial passages 22 through the upper portion of the plug 10 adjacent the periphery thereof, connect the chambers 15 and 17, while a central axial passage 23 in said plug connects the outlet pipe 11 and the area interiorly of the coil 13.

A tube 24 is preferably secured in the piston 14 and depends through the coil in clearance relation therewith to a sliding fit on a central projection 10a of the plug 10 about the upper portion of the passage 23; said tube having ports 25 therethrough near its lower end. If desired, the tube may have radial fins 26 on the outside, to brace the coil and prevent possible lateral buckling or deflection thereof under certain operating conditions.

The piston 14 is provided with a rigid, upstanding stem 27 threaded at its upper end and provided with a removable cross handle pin 28. The casing 13 above the piston is closed by a vertically adjustable head 29 having (especially for high pressure work) a compression spring 30 riding on the top of the piston. A packing gland in the head and including a nut 31 surrounds the stem 27, while an adjusting nut 32 on the threaded portion of the stem under the pin 28 engages the nut 31. The lower portion of the stem 27 is provided with an axial passage 33 having ports 34 establishing communication between said passage and a lateral passage 35 in the casing above the piston. The passage 35 is connected to an air dome 36.

In operation, the fluid to be filtered passes at relatively high pressure into the chamber 15 from the intake pipe 16, through the chamber 17 and passages 22, and fills the chamber 15. The fluid then passes between the turns of the coil 13 into the space between the coil and the tube 24, leaving foreign matter filtered therefrom on the outside walls of the turns of the coil and inside the chamber 15.

As in the first described type of filter, the pressure of the fluid bearing against the piston 14 tends to cause the coil to be extended, and the filtering passage between the turns of the coil to be correspondingly widened. This pressure is resisted to any desired degree by altering the pressure of the spring 30, which is done by adjusting the head 29. If it is desired to have a constantly wider passage between the turns of the coil than that normally provided by the natural setting of the coil, this may be obtained by pulling up on the stem 27, or advancing the nut 32.

As the filter approaches a clogged condition, some compensating action of an automatic nature will occur, in that the pressure then naturally rises on the intake side of the coil, which, acting against the piston 14 with increased pressure, tends to separate the turns of the coil so that sufficient fluid will pass therethrough to effect a balance. The curved walls of the various turns of the coil on the intake or pressure side provide a suitable base of considerable area to form a filter bed. If the filter has become nearly clogged at the given pressure, the flow will be increased if this filter bed is agitated, or if the opening is widened, while agitation of the coil may be imparted thereto by rotating the piston back and forth slightly. This has a wiping action on the adjacent turns of the coil, and may also be used to more permanently set the coil if desired. In this case the piston to which the upper end of the coil is rigidly secured is turned by means of the pin 28 the desired amount to place the coil under a certain torque, and may be then clamped against retractive movement. With such a setting of the coil, the fins 26 on the tube 24 prove of value to brace the coil against possible lateral deflection from a straight position when subjected to severe vibrations, sudden jars and other conditions which may be obtained as the filter is mounted on an airplane, for instance.

The filter may be manually cleaned out by removing the pin 28 and the nut 32 from the stem 27, and unscrewing the plug 10 from the casing, and to which plug the filter coil and the piston are secured. Automatic cleaning, however, is effected by the use of the air dome. With the flow of the fluid continuing to enter the filter under pressure, the outlet valve 12 is closed. This allows the maximum pressure to build up in the dome 36, the filtered fluid entering the same from the tube 24 through the passage 33 and ports 34. The inlet valve 20 is then closed, the fluid supply then returning to the source through the bypass. The drain cock 21 is then opened, which suddenly relieves the pressure within the filter, and the filtered fluid from the dome passes down the tube, through the ports 25, and thence between the turns of the filter coil from the inside, finally passing through the passages 22 and sediment chamber 17 to the drain. The flow through the filter is thus reversed, resulting in the accumulation of foreign matter on the outside of the filter coil being washed off and drained out.

While I have here shown and described the filter coil as being of the tension type, one of the compression type may also be used under certain conditions, and when suitably mounted and controlled. Also, while I have here shown the filter as comprising a single filter coil only, it is obvious that a filter unit may be made with a multiplicity of coils therein if greater capacity is desired without any increase in the length of the filter.

While the device is intended essentially as a filter, the unit as a whole may also be used as a pressure regulating valve, a restrictor valve or bypass valve, such as are commonly used in various installations, but with the added advantage of having filtering qualities.

In the high pressure work for which this filter is intended, it is essential that the passageways between the inside and outside of the filter coil be dimensioned to effect equal frictional heads, as otherwise the coil might not open equally throughout its length. A filter-coil wire having the cross sectional form necessary to give this result is therefore used.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a fluid filter which includes a body having spaced inlet and outlet openings, a filter element in the body interposed between the openings and including a closely wound helical coil spaced from the body providing a relatively narrow filtering passage between adjacent turns of the coil extending continuously from one end of the coil to the other and through which the fluid must pass between the inlet and outlet, the element coil being of the tension type, with means mounting the element in the body for extension by fluid pressure on the inlet side so that such pressure will tend to extend the coil; and separate manual means to extend the coil.

2. A fluid filter including a body having spaced inlet and outlet openings, a filter element in the body interposed between the openings and comprising a closely wound helical tension coil providing a relatively narrow filtering passage between adjacent turns of the coil extending continuously from end to end of said coil means mounting the coil in the body for extension by fluid pressure on the inlet side whereby such pressure will tend to extend the coil, and a manually adjustable compression spring separate from and resisting such extension of the coil.

3. A filter including a body, a filter element extending lengthwise in the body and including a closely wound helical tension coil spaced from the body, a fixed plug securing one end of the coil in the body, a sliding plug secured on the other end of the coil and closely and freely slidable in the body in a direction to extend the coil; one plug having an opening therethrough leading from the body beyond the coil to the interior of the coil and the other plug having an opening therethrough from the body about the coil to the body beyond the coil, means forming an inlet passage communicating with the opening of one plug and means forming an outlet passage communicating with the opening of the other plug.

4. A filter including a body, a filter element extending lengthwise in the body and including a closely wound helical tension coil spaced from the body, a fixed plug securing one end of the coil in the body, a sliding plug secured on the other end of the coil and closely and freely slidable in the body in a direction to extend the coil; one plug having an opening therethrough leading from the body beyond the coil to the interior of the coil and the other plug having an opening therethrough from the body about the coil to the body beyond the coil, means forming an inlet passage communicating with the opening of the fixed plug and means forming an outlet passage communicating with the opening of the sliding plug.

5. A filter comprising an elongated body, a plug in one end of the body having a fluid outlet passage therethrough, and provided intermediate its ends with an annular passage forming a sediment chamber with the adjacent portion of the body, a valved fluid inlet to said chamber, a valved drain therefrom, a tubular filter element extending lengthwise in the body from and secured at one end on the inner end of the plug, the outlet passage communicating with the interior of the element and the plug having an opening therethrough from the chamber to the body about the element, a body closure member on which the other end of the element is secured, a passage from the body beyond said member and an air dome to which said passage is connected; there being an opening through the member from within the element to the body beyond the member.

6. A filter comprising a barrel-like body, a pair of plugs mounted in said body in spaced relation, one of said plugs being fixed relative to the body and the other plug having a close running fit within the body and movable relative thereto, a filter element in the body consisting of a closely wound helical tension coil in cylindrical form and having its outer surface spaced from the inner wall of the body, each end of the coil being connected with one of said plugs, means to admit fluid under pressure to one side of the coil and between the plugs whereby the pressure of such fluid will tend to slide the movable plug within the body in a direction to extend the coil and open the spaces between the convolutions thereof and permit the passage of the fluid from the one side of the coil to the other side thereof for filtering said fluid, and means to allow said filtered fluid to pass from the body.

7. A filter as in claim 6 with a spring, separate from the coil interposed between one end of the body and the movable plug, and acting against the latter in a direction to tend to resist the movement imparted to the plug by such fluid pressure.

8. A filter as in claim 6 with a manually adjustable spring, separate from the coil interposed between one end of the body and the movable plug, and acting against the latter to tend to resist the movement imparted to the plug by such fluid pressure.

9. A filter as in claim 6 with an adjustable head on the end of the body adjacent the movable plug, and a compression spring interposed between said head and said movable plug.

10. A filter as in claim 6 with a stem on the movable plug projecting outside the adjacent end of the body in sliding relation to such end, and a nut threaded on the outside of the stem and engaging the outside of such end of the body.

11. A filter as in claim 6, and a tube disposed substantially concentrically within the coil in spaced relation with respect to the inner wall thereof, said tube being fixed to the movable plug and being perforated.

12. A filter as in claim 6, a tube disposed substantially concentrically within the coil in spaced relation with respect to the inner wall thereof, said tube being fixed to the movable plug and being perforated, and spaced fins along the length of the tube engaging the inside of the coil.

13. A filter as in claim 6, a tube disposed substantially concentrically within the coil in spaced relation with respect to the inner wall thereof, said tube being fixed to the movable plug and being perforated, an air dome, and means establishing communication between the air dome and tube.

14. A filter as in claim 6, a tube disposed substantially concentrically within the coil in spaced relation with respect to the inner wall thereof, said tube being fixed to the movable plug, and being perforated, a stem projecting outwardly from the movable plug toward the adjacent end of the body, such stem being provided with an orifice opening at one end into the tube and at the other end into the body on the opposite side of the plug, an air dome, and means establishing communication between the air dome and the interior of the body at a point between the movable plug and the adjacent end of the body.

WALTER J. NEISINGH.